United States Patent
Havas et al.

(10) Patent No.: US 9,165,303 B2
(45) Date of Patent: Oct. 20, 2015

(54) FRESH PRODUCT SYSTEM

(75) Inventors: Peter Roy Havas, San Francisco, CA (US); Cameron John Carrett, San Francisco, CA (US)

(73) Assignee: SPECIALTY'S CAFE AND BAKERY, INC., San Francisco, CA (US)

( * ) Notice: Subject to any disclaimer, the term of this patent is extended or adjusted under 35 U.S.C. 154(b) by 1172 days.

(21) Appl. No.: 12/326,802

(22) Filed: Dec. 2, 2008

(65) Prior Publication Data
US 2010/0138497 A1    Jun. 3, 2010

(51) Int. Cl.
G06Q 30/00    (2012.01)
G06Q 30/02    (2012.01)

(52) U.S. Cl.
CPC ........................... G06Q 30/02 (2013.01)

(58) Field of Classification Search
USPC ............................................................ 705/14
See application file for complete search history.

(56) References Cited

U.S. PATENT DOCUMENTS

| | | | |
|---|---|---|---|
| 389,904 | A | 2/1973 | Carraizo |
| 4,797,818 | A | 1/1989 | Cotter |
| 6,321,211 | B1 | 11/2001 | Dodd |
| 6,618,062 | B1 | 9/2003 | Brown et al. |
| 6,865,546 | B1 | 3/2005 | Song |
| 7,130,817 | B2 | 10/2006 | Karas et al. |
| 7,149,710 | B1 | 12/2006 | Edmark |
| 7,412,461 | B2 * | 8/2008 | Sholl et al. .............................. 1/1 |
| 2002/0032613 | A1 | 3/2002 | Buettgenbach et al. |
| 2002/0178089 | A1 | 11/2002 | Bezos et al. |
| 2003/0061566 | A1 | 3/2003 | Rubstein et al. |
| 2003/0130907 | A1 | 7/2003 | Karas et al. |
| 2006/0078658 | A1 * | 4/2006 | Owens et al. .................. 426/231 |
| 2007/0061225 | A1 | 3/2007 | Havas |
| 2009/0065579 | A1 * | 3/2009 | Grant et al. ................... 235/385 |

OTHER PUBLICATIONS

Business Editor/Technology Writers, YottaMark Launches HarvestMark(R) for Cases, Jul. 22, 2008, BusinessWire.*
U.S. Appl. No. 10/206,682, Havas.
U.S. Appl. No. 12/267,408, Havas.

* cited by examiner

Primary Examiner — Alvin L Brown
(74) Attorney, Agent, or Firm — Oblon, McClelland, Maier & Neustadt, L.L.P.

(57) ABSTRACT

A method is used for enabling fresh products related information to be sent to potential customers, where fresh products become available at one or more locations at different times during the day. The method comprises receiving at a server from said locations information regarding freshness of the fresh products that are or will become available at said locations; and presenting the information and said locations on a webpage by means of a server. A storage may be used to store information regarding one or more locations where fresh products are or will become available, and regarding freshness of the fresh products at the locations. A processor may be used to present the webpage that displays the stored information. Fresh products may include cookies, fresh produce and flowers.

21 Claims, 7 Drawing Sheets

Specialty's Cookie Ready Message Emails - Windows Internet Explorer http://www.specialtysdirect.com/Cookie_Ready_Message_popup_email.asp?viewmode=create

NEW Specialty's Warm Cookie Map and Cookie Ready Message
— select one —

| Warm Cookie Map | Cookie Ready Message | View Existing Email Alerts |

Flavors

☑ Semi Sweet; ☐ Milk Chocolate; ☐ Black & White; ☐ Peanut Butter; ☐ Wheatgerm Chocolate Chip; ☐ Almond Tea; ☐ Peanut Butter Chocolate; ☐ Assorted; ☐ Oatmeal Raisin;

Stores

Chicago, IL: ☐ 191 N Wacker Dr; Seattle, WA: ☐ 505 5th Ave S; ☐ 1023 3rd Ave; ☐ 701 5th Ave; ☐ 1400 5th Ave; ☐ 2690 NE Village Ln; Bellevue, WA: ☐ 500 108th Ave NE; ☐ 126 Bellevue Square; San Francisco, CA: ☐ 150 Spear St; ☐ 185 Berry St; ☑ 369 Pine St; ☐ 101 New Montgomery St; ☐ 1 Post St; ☐ 22 Battery St; ☐ 505 Sansome St; South San Francisco, CA: ☐ 701 Gateway Blvd; San Jose, CA: ☐ 2580 N 1st St; Santa Clara, CA: ☐ 3399 Bowers Ave; San Mateo, CA: ☐ 1886 S Norfolk St; Redwood City, CA: ☐ 1100 Island Dr;

Times

☐ 6:00am - 9:00am; ☐ 9:00am - 11:00am; ☐ 11:00am - 2:00pm; ☑ 2:00pm - 4:00pm; ☐ 4:00pm - 6:00pm;

[Create Email Alert]

Done | Internet | 100%

*FIG. 8*

FRESH PRODUCT SYSTEM

BACKGROUND OF THE INVENTION

This invention relates to methods and systems for enabling product information to be disseminated, and in particular to methods and systems for disseminating information about products that are best consumed when they are still fresh, such as warm cookies and fresh produce.

Many products are best consumed when they are still fresh. Cookies, for example, taste best when they are freshly baked and are still warm. Other products that are best consumed fresh includes fresh vegetables and flowers. However, the systems currently in use for marketing such products do not adequately inform customers when such products become available, so that they can be purchased in the best condition for consumption. This can reduce the appeal of the product, such as for cookies, and may lead to waste, such as when fresh produce becomes wilted. It is therefore desirable to provide a fresh product system that can provide timely information on fresh products to consumers.

SUMMARY OF THE INVENTION

In one embodiment, a system for enabling warm cookie related information to be sent to potential customers comprises a storage that stores information regarding one or more locations where warm cookies are or will become available and regarding freshness of the warm cookies at the locations. The system also includes a processor that presents a webpage that displays said information.

Another embodiment includes a method for enabling warm cookie related information to be sent to potential customers, where cookies are made continually over a substantial part of a day and become available at a plurality of locations at different times during the day. The method comprises receiving at a server from said locations information regarding freshness of the warm cookies that are or will become available at said locations; and presenting the information and said locations on a webpage by means of a server.

In one more embodiment, a system for enabling fresh products related information to be sent to potential customers comprises a storage that stores information regarding one or more locations where fresh products are or will become available and regarding freshness of the fresh products at the locations. The system also includes a processor that presents a webpage that displays said information.

Yet another embodiment includes a method for enabling fresh products related information to be sent to potential customers, where fresh products become available at a plurality of locations at different times during the day. The method comprises receiving at a server from said locations information regarding freshness of the fresh products that are or will become available at said locations; and presenting the information and said locations on a webpage by means of a server.

BRIEF DESCRIPTION OF THE DRAWINGS

FIG. 5-8 are views of webpages displaying forms for a customer to fill in information for sending a redeemable cookie message to illustrate the embodiments of FIGS. 3 and 4.

Identical components in this application are labeled by the same numerals.

DETAILED DESCRIPTION OF EXEMPLARY EMBODIMENTS

Figure 1:
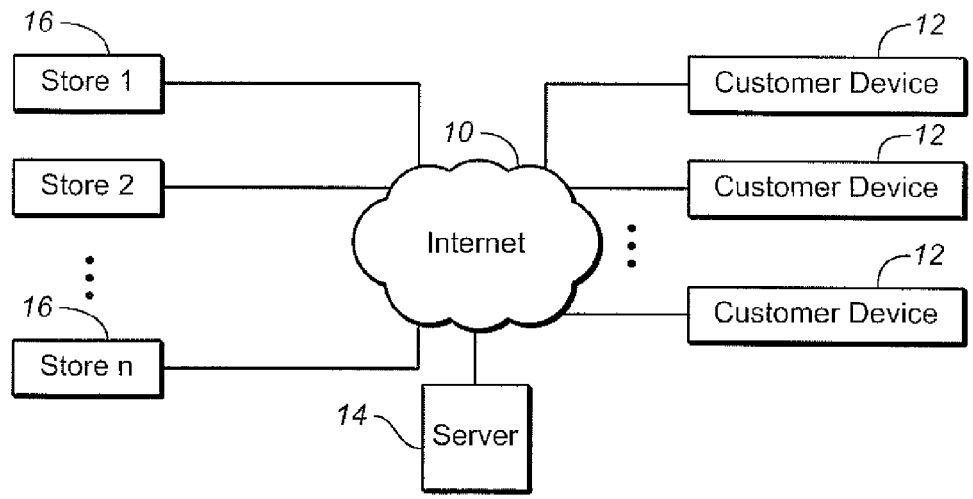
FIG. 1 is a diagram illustrating a block diagram illustrating one embodiment of the invention.

FIG. 1 is a block diagram illustrating one embodiment of the invention. As shown in FIG. 1, connected together by network 10 are a plurality of customer information devices or appliances 12 (for customers who may wish to view web pages for information regarding warm cookies or receive warm cookie messages when warm cookies become available, or both), a server 14, and store devices or appliances 16 at a plurality of stores numbered 1 through n that can send information concerning the status of warm cookies available at the stores to server 14. Network 10 may be any type of network that is used to connect a server, stores and consumers, such as the world wide web or internet. The information devices or appliances 12 and 16 employed by the customer and the stores may be any one of many types of different devices that can be used to perform the operations described below through the internet, including desktop, laptop and notebook computers, cellular telephones, personal digital assistants, MP3 players and other types of digital media players, set top boxes and other type of devices.

Figure 2:
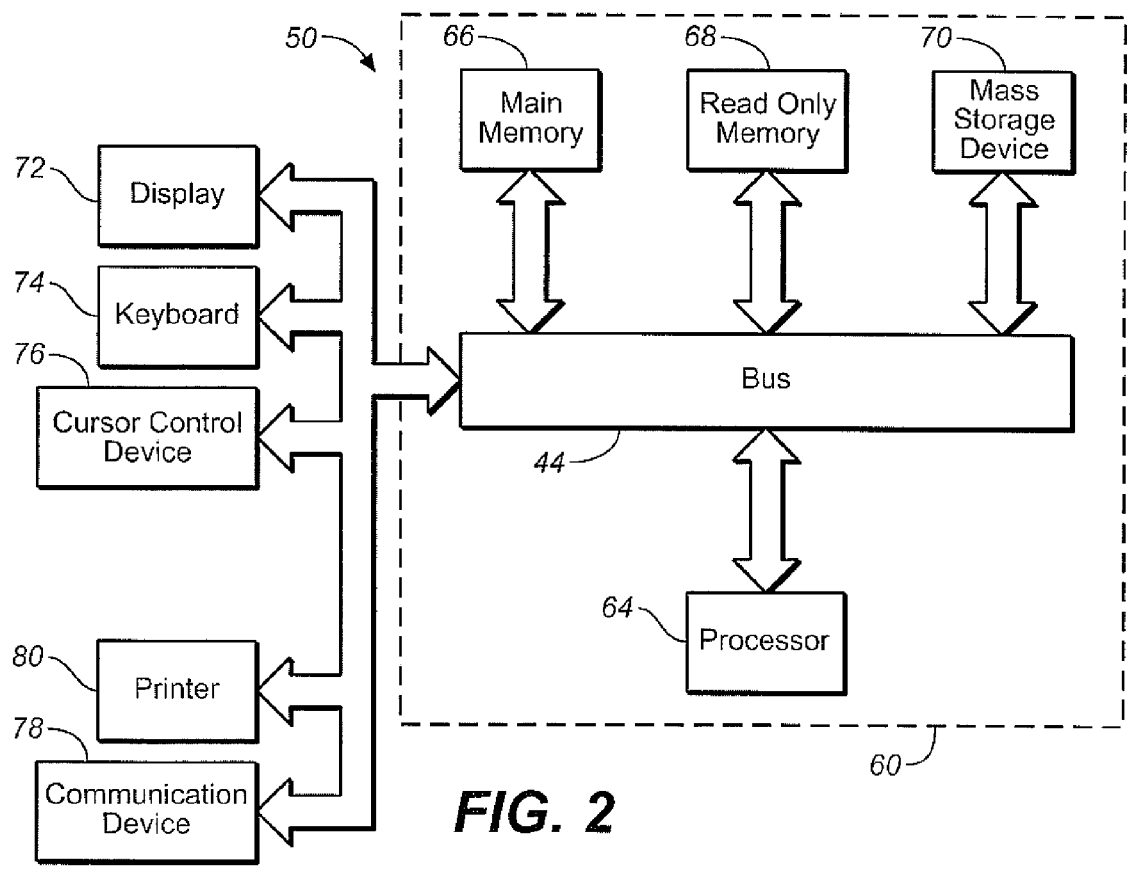
FIG. 2 is an example of a computer system for implementing the embodiment of FIG. 1.
Figure 3:
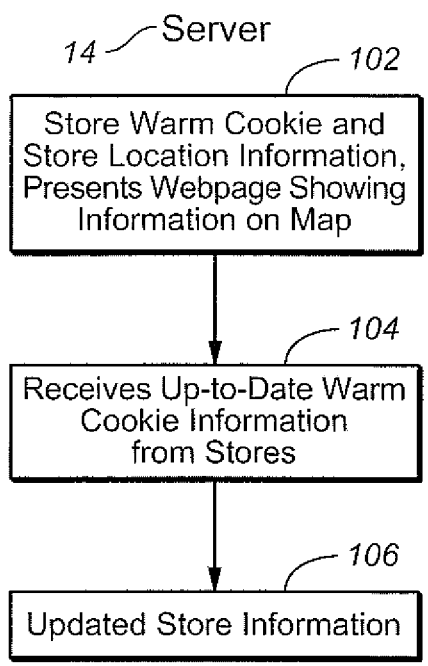
FIG. 3 is a flow chart showing a process carried out by a computer server for storing and updating warm cookie information at stores, and presenting this information on a webpage to illustrate one embodiment of the invention.
Figure 4:
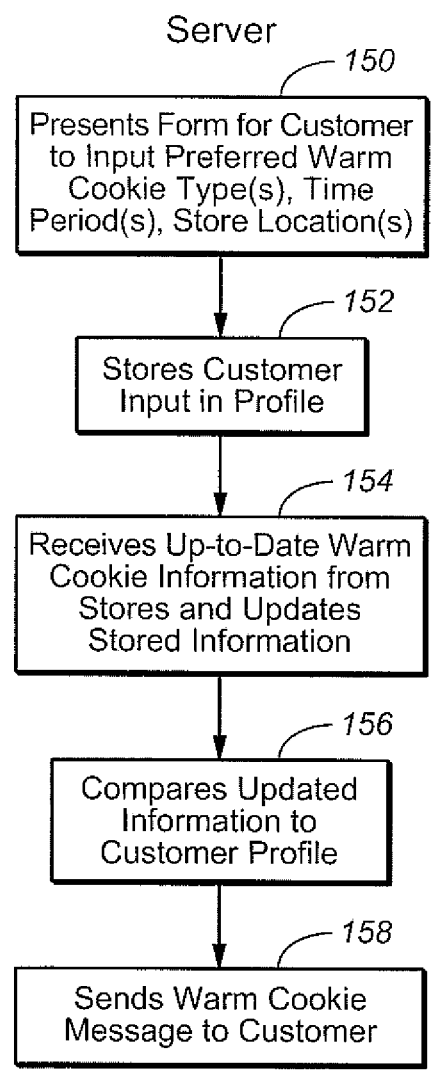
FIG. 4 is a flow chart showing a process carried out by a computer server for storing customer preference for type of warm cookies, and sending warm cookies message to a customer for illustrating another embodiment of the invention.

FIG. 2 is an example of a computer system 50, which together with peripherals, may be used for implementing the server 14, customer information devices or appliances 12 and store devices or appliances 16 in the embodiment of FIG. 1. As shown in FIG. 2, the computer system 50 includes a computer bus 44. Various applications are software stored in the mass storage device 70. Processor 64 reads the application software from device 70 into the main memory 66 and executes the code in the software in a manner known to those skilled in the art to perform the various functions described herein. When used to implement server 14, forms (e.g. those of FIG. 8), web pages or screen (e.g. those of FIGS. 5-7), and customer data (e.g. customer input to form of FIG. 8), may reside in the mass storage device 70 accessed by processor 64. Processor 64 carries out the operations described below in reference to the flow charts of FIGS. 3 and 4, by reading the appropriate application software from device 70 into the main memory 66 and executing the code in the software. The computer system 50 may be operated by the user via keyboard 74 and cursor control device 76. When used to implement server 14, computer system 50 communicates with external systems such as the information appliances 12 and 16 for the customers and for the stores in FIG. 1 through the internet 10 and communication device 78, which may be a modem or a wireless communication device such as WI-FI, Blue Tooth, infrared systems, or radio waves systems. Display 72 and printer 80 may be used to print or display information present on the bus 44. When used to implement customer information devices or appliances 12 or store devices or appliances 16, computer system 50 communicates with server 14 in FIG. 1 through the internet 10 and communication device 78, which may be a modem or a wireless communication device such as WI-FI, Blue Tooth, infrared systems, or radio waves systems.

Figure 5:

The process for providing information on the availability of warm cookies to customers through a web interface is illustrated in reference to FIGS. 3-9. While the description below is in reference to one customer and one store information device or appliance, it will be understood that the same operation described below will apply to other customer and store information devices or appliances. In reference to FIG. 3, server 14 stores therein the locations of stores and warm cookie availability information at these stores (block 102). Where server 14 is implemented by means of computer system 50 including peripherals of FIG. 2, this information may be stored in mass storage 70. Server 14 presents this information on a web page described below. First, for interaction with customers, server 14 presents the web page shown in FIG. 5. As shown in FIG. 5, when displayed on information device or appliance 12, this web page includes various options which customers can select, such as by clicking using a computer mouse or a button on a cellular phone in device or appliance 12, one option of which is the "Warm Cookie Map." Once this is selected by a customer through the device or appliance 12, server 14 will provide to device or appliance 12 the store locations and warm cookie availability information on a web page, or a warm cookie map, such as the one shown in FIG. 6.

In one embodiment, cookies are continually being baked at or delivered to various stores and become available intermittently during time periods during the day, so that warm cookies become available at different times of the day during such time periods. In such event, the warm cookie availability information stored in server 14 will need to be updated dynamically during such time periods during the day, so that customers can obtain up-to-date information on whether warm cookies are available, and at which one or ones of the stores. For this purpose, the store device or appliance 16 will send messages to server 14 when warm cookies become available at such store locations, such as when the cookies are retrieved from one or more ovens at least one of the stores. Server 14 receives this information from at least one of the stores and updates the warm cookie availability information stored (blocks 104 and 106). While preferably the same server 14 that receives this information from at least one of the stores also presents the updated warm cookie availability information on a web page or sends alert messages to customers as described below, it will be understood that two different servers that communicate with each other to pass the needed updated warm cookie availability information may be used: one receiving this information from at least one of the stores and another one presenting the updated warm cookie availability information on a web page and messages to customers may be sent by either one of the two servers. Preferably, different types of cookies are being baked to provide different flavors for customers with a wide variety of tastes. In such case, the warm cookie availability information stored in storage and presented on a web page will include the type or types of cookies that are available.

Figure 7:
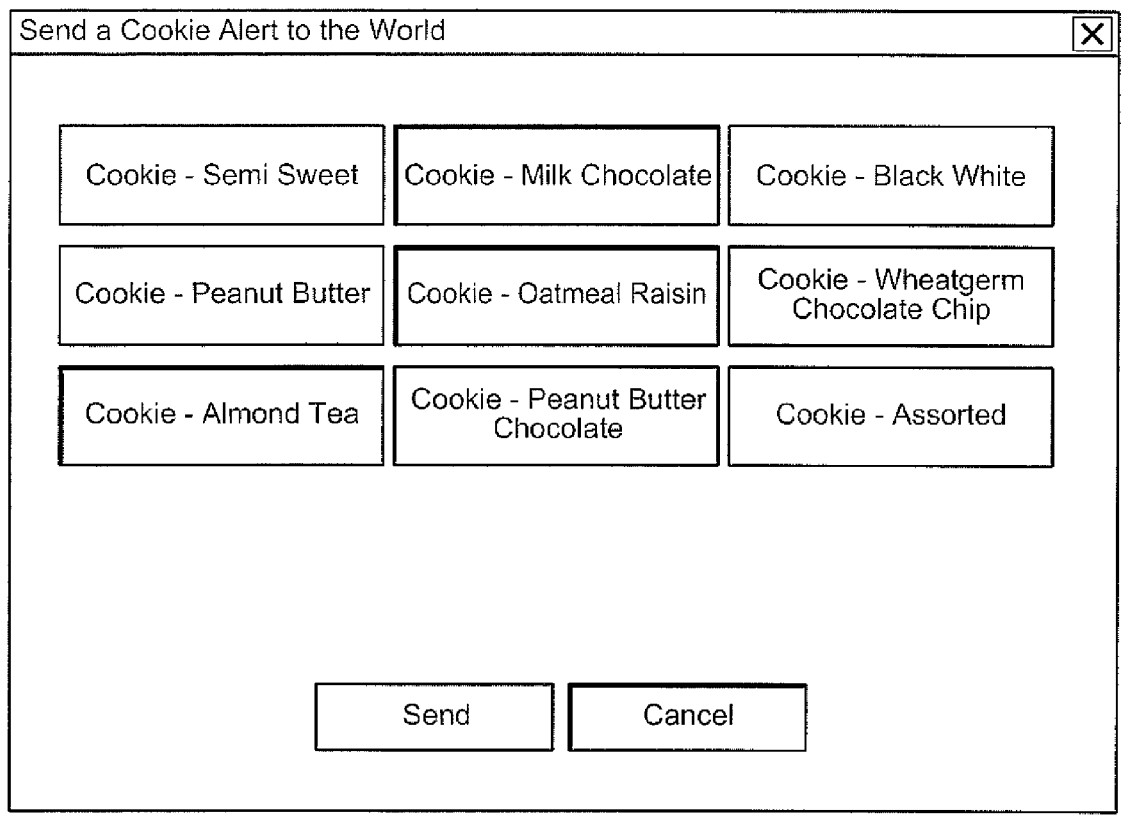

FIG. 7 illustrates a screen displayed by a store device or appliance 16, where the screen serves as a user interface for store personnel to send messages to server 14 when warm cookies become available at such store locations. Where device or appliance 16 is implemented by means of computer system 50 and at least some of the peripherals of FIG. 2, this screen is presented on display 72. When cookies (e.g. almond tea) of a particular type are baked and retrieved from one or more ovens at the store involved, store personnel would press or click on the appropriate button labeled "cookie—almond tea" on the screen to so indicate. Once the "send" button is subsequently pressed or clicked, processor 64 in device or appliance 16 detects this and sends a message to server 14 via the communication device 78 and network 10 to indicate the type of cookie that has become available. Server 14 will then update the warm cookie availability information stored and presented on the web page sent to the network 10. As illustrated in FIG. 7, more than one type of cookie may be available at the same time (e.g. almond tea, milk chocolate and oatmeal raisin cookies baked in the same batch, shown as shaded in FIG. 7) at the same store so that the store personnel would press or click on the appropriate multiple buttons on the screen to so indicate.

Figure 6:
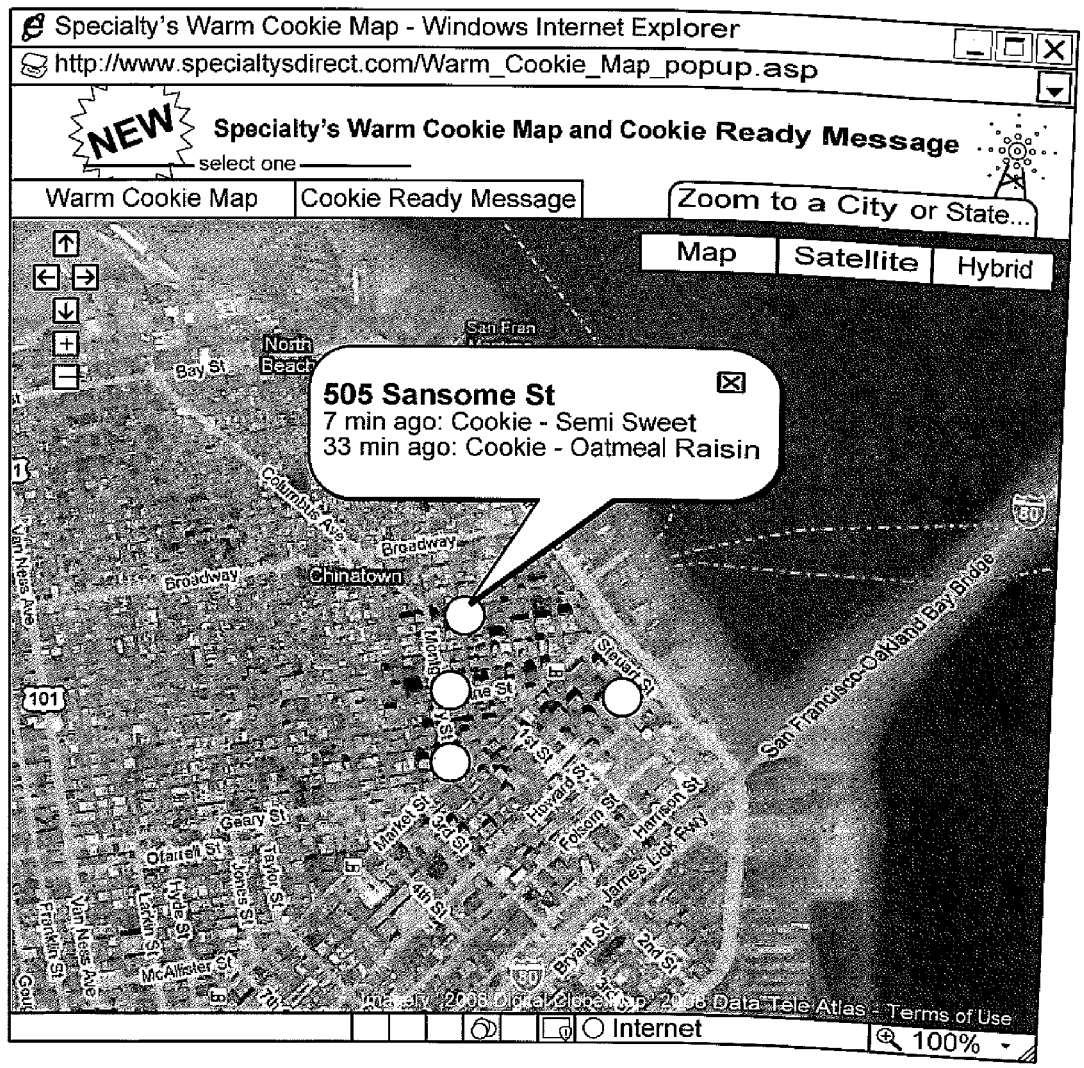

Preferably, store personnel would press or click on the appropriate button on the screen when the cookies have been baked and become available. One indication of freshness of a cookie is the time elapsed since the cookie is retrieved from the oven. Thus, the elapsed time "7 min. ago" may be shown on the web page to indicate cookie freshness, as shown in FIG. 6. In an alternative embodiment, store personnel would press or click on the appropriate button on the screen a short time before the baker has finished baking the cookies, and is thus not yet available. The warm cookie information stored in storage 70 would then indicate the expected time or times when warm cookies will be available instead of the elapsed time. This allows the system to provide the opportunity for customers to purchase cookies right when they are retrieved from the oven, which may be attractive to some customers. However, in the event that the baking process is not successful or interrupted for any reason after the store personnel pressed or clicked on the appropriate buttons, this may cause some customers to be disappointed when they are not able to access cookies at the expected time. Hence this alternative embodiment may be useful where the baking process is improved to the extent that the risk of this happening is small.

The cookies after retrieval from the oven will cool off in time, so that in time, they are not warm anymore, such as after 45 minutes or an hour. Thus, server 14 implements a threshold (e.g. 45 minutes or an hour) by which information at a particular store concerning cookies that are no longer warm will be altered in storage 70 (e.g. into the category: no warm cookies available) and no longer presented on the web page as having warm cookies available, such as the web page of FIG. 6. For example, information regarding elapsed time for cookies that were retrieved from the oven more than one hour ago may be removed from storage and the webpage, such as that in FIG. 6. In such event, the store location may be displayed on the web page with a note that "no warm cookies found" when customer clicks on or places the cursor at the store location.

As noted above, in an alternative embodiment, the expected time or times when warm cookies will become available may be shown instead of the time elapsed since the cookie was retrieved from the oven. For example, the "7 minutes ago" indication in FIG. 6 may be replaced by the note that "expected in 7 minutes." Also shown preferably is the type of warm cookie that is available, and at which location. Preferably, the warm cookie map shows all the locations where warm cookies are available at some point in time, and shows icons in the shape of cookies at the stores where warm cookies are currently available. In FIG. 6, for example, such icons are shown as cookies enclosed within a circular ring at the locations of four stores. By placing the cursor in display 72 of the device or appliance 12 or clicking the cookie icon at the location of one of the four store locations in the web page, for example, the type of warm cookies and the freshness information at this particular store location are displayed for view by the customer. The same can be done at the other three store locations to display the type of warm cookies and the freshness information at each one of the other three store locations. Preferably, all of the store locations are shown, including the stores where no warm cookies are currently available, where the icons may be shown in a different shape or size (shown as smaller cookies in FIG. 6) and/or color compared to the store locations where warm cookies are currently available. When a customer places the cursor in display 72 of the device or appliance 12 or clicks the cookie icon at the location of such a store, the note "no warm cookies found" will be displayed. While the time elapsed since a cookie is retrieved from the oven may be used as a gauge for freshness, obviously other measures may be used instead and are within the scope of the invention. For example, another measure of freshness can be the temperature of the cookie or another product such as a food product that requires heating during processing.

The web page of FIG. 6 illustrates a warm cookie map, showing a satellite view of the area concerned, and superimposed onto it the cookie icons at store locations where cookies are available, as well as the cookie icons at store locations where warm cookies are not available at this point in time. This map may be composed using, for example a software map application modified so that the icons for stores are superimposed thereon and with the features described above for showing the type of cookies and freshness indication. The implementation of this modification is known to those skilled in the art, and thus need not be described in detail herein.

For the convenience of customers, in one embodiment, customers may wish to receive messages regarding the type or types of cookies that they prefer along with the store locations where these cookies may be found. Preferably customers can also receive these messages at the times or within certain time periods indicating the availability of warm cookies at these locations. This is illustrated in the flow chart of FIG. 4 and the web pages of FIGS. 5, 8 and the message in FIG. 9.

The entry point for customers is again the web page shown in FIG. 5. If a customer clicks the link "click here now" for "Warm Cookie Ready Message" on the web page displayed by device or appliance 12, server 14 will return to the customer a web page such as that of FIG. 8, which may be a form for the customer to fill in and send back to the server. As shown in FIG. 8, this web page permits the customer to specify the preferred types or flavors of warm cookies, the preferred locations where these warm cookies are available, and the time periods during which these cookies are available, and during which the customer would like to receive messages concerning the availability of warm cookies at the specified locations. See Block 150 in FIG. 4. The customer sees this web page on device or appliance 16, and inputs the information requested (the types or flavors of cookies, the locations where these warm cookies are available, and the time periods during which the customer would like to receive messages concerning warm cookie availability). When the customer clicks the button "Create Email Alert" in FIG. 8, a message containing the information inputted by the customer is sent to server 14 via the communication device 78 of device or appliance 12. The server 14 stores as a customer profile the information input in this message from the customer along with the identity of the customer in mass storage 70 in FIG. 2. See Block 152 in FIG. 4.

Figure 9:
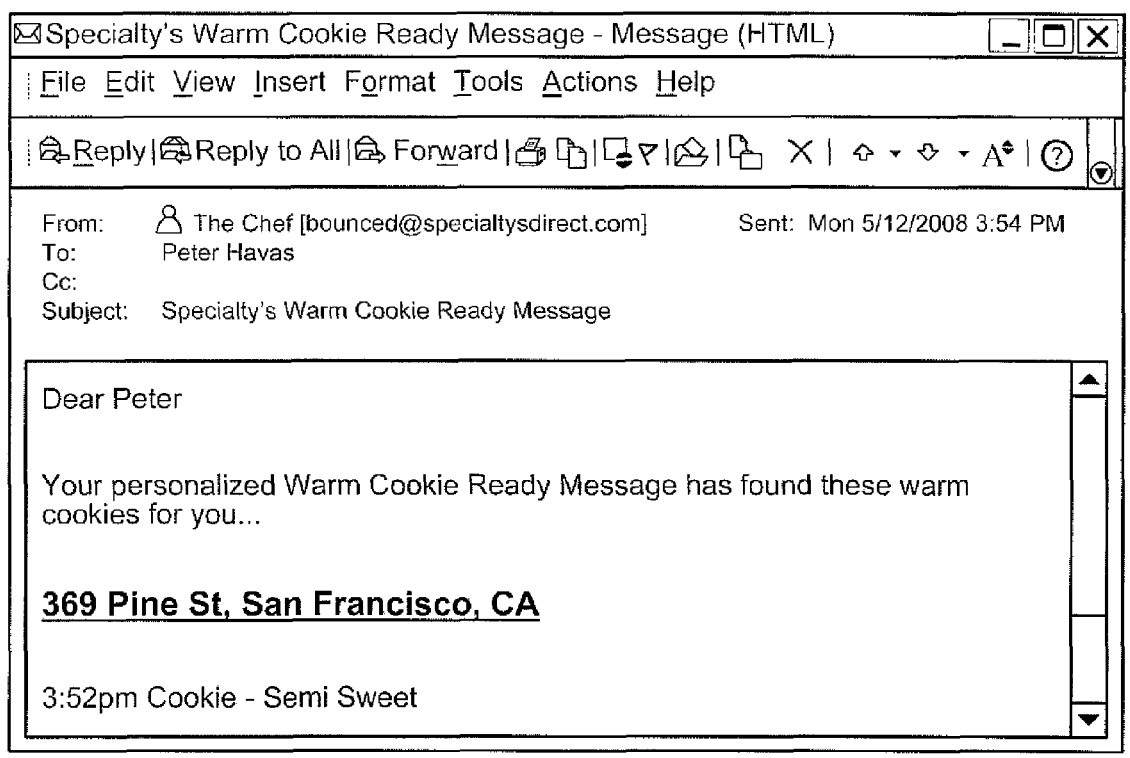
FIG. 9 is a view of a display of a warm cookie message the embodiment of FIG. 4.

When server 14 receives up-to-date warm cookie availability information from the devices or appliances 16 at one or more, of the stores, it updates the information stored in storage 70 as described above. Block 154. This updated information is then matched and compared with the customer profiles stored in storage 70 (Block 156). If the up-to-date warm cookie availability information indicates that the type or types of warm cookies available at store locations match those specified in any customer profile stored in storage at server 14, server 14 will send a warm cookie message to the customer with such profile to inform the customer. See Block 158 in FIG. 4. One example of such message is illustrated in FIG. 9.

Essentially the same system as that described above may be used for the collection of information concerning other types of fresh products best consumed when they are still fresh. Such products include fresh vegetables and flowers. Freshness of fresh vegetables and flowers may be measured at farms or gardens by the time elapsed since the time they are harvested or picked in the case of fresh vegetables or cut in the case of flowers. While the time elapsed since fresh vegetables and flowers are harvested, picked or cut may be used as a gauge for freshness, obviously other measures may be used instead and are within the scope of the invention.

Stores where such fresh products are available may keep track of this freshness information gathered at farms or gardens using devices or appliances 16 as well as the type or types of fresh products, and send to a server 14 information regarding the type or types and freshness information in the manner as that described above for cookies. Server 14 stores this information and updates it when it receives message(s) from one or more stores. Server 14 or another server may be used to update the webpage presented to network 10 using the updated information, again in the manner as that described above for cookies. Server 14 or another server also interacts with customers who wishes to receive messages concerning fresh products availability information in the manner as that described above for cookies.

While the invention has been described above by reference to various embodiments, it will be understood that changes and modifications may be made without departing from the scope of the invention, which is to be defined only by the appended claims and their equivalents.

What is claimed is:

1. A method of providing to potential customers information regarding the availability of fresh products, comprising:
   receiving, from a first computer associated with at least one of a plurality of store locations, an indication of the availability of a fresh product at the store location;
   storing the received indication on a server;
   communicating, based on a previously stored preference of a potential customer, the indication, which is generated based on the previously stored preference of the potential customer and is received in response to transmission of the preference of the potential customer, to a second computer that is associated with the potential customer who has previously indicated, in the stored preference, a request to receive the indication of the availability of a fresh product, for presenting, on a display on the second computer to the potential customer, the plurality of store locations and the indication of the availability of a fresh product at the store location, along with a street address of the store location;
   receiving, from the first computer, an updated indication of the availability of a fresh product at the store location;
   storing the updated indication on the server; and
   communicating the updated indication to the second computer for presenting, on the display on the second computer to the potential customer, the plurality of store locations and the updated indication of the availability of a fresh product at the store location, wherein presenting the plurality of store locations and the indication and presenting the plurality of store locations and the updated indication comprise presenting a webpage display of the plurality of store locations, receiving an indication of the availability of a fresh product comprises receiving an indication that the fresh product is currently available at the store location, and presenting the plurality of store locations and the indication comprises displaying the indication that the fresh product is currently available at the store location.

2. The method of claim 1, wherein receiving an indication of the availability of a fresh product comprises receiving information, from a first computer associated with a store location where cookies are made over a substantial part of a day, regarding the availability of warm cookies made at the store location.

3. The method of claim 1, wherein presenting the plurality of store locations and the indication and presenting the plurality of store locations and the updated indication comprise presenting a map of the plurality of store locations.

4. The method of claim 1, wherein presenting the plurality of store locations and the indication comprises displaying time elapsed since the fresh product has become available at the store location.

5. The method of claim 4, wherein presenting the plurality of store locations and the updated indication comprises displaying that the fresh product is not available at the store location, after time elapsed exceeds a threshold.

6. The method of claim 1, wherein receiving an indication of the availability of a fresh product comprises receiving a type of fresh product available at the store location.

7. The method of claim 6, wherein presenting the plurality of store locations and the indication comprises displaying the type of fresh product available at the store location.

8. The method of claim 6, wherein each of the plurality of store locations presented on the webpage display is selectable by a user, wherein presenting the plurality of store locations and the indication comprises displaying the type of fresh product available at the store location when the store location is selected by the user.

9. The method of claim 1, wherein receiving an indication of the availability of a fresh product comprises receiving an indication that the fresh product will be available at the store location at an expected time.

10. The method of claim 9, wherein presenting the plurality of store locations and the indication comprises displaying the expected time and the indication that the fresh product will be available at the store location at the expected time.

11. A method of providing to potential customers information regarding the availability of fresh products, comprising:
receiving, from a first computer associated with at least one of a plurality of store locations, an indication of the availability of a fresh product at the store location;
storing the received indication on a server;
communicating, based on a previously stored preference of a potential customer, the stored indication, which is generated based on the previously stored preference of the potential customer and is received in response to transmission of the preference of the potential customer, to a second computer that is associated with the potential customer who has previously indicated, in the stored preference, a request to receive the indication of the availability of the fresh product, for communicating, to the potential customer, the stored indication to inform the potential customer of the availability of a fresh product at the store location, and of a street address of the store location;
receiving, from the first computer, an updated indication of the availability of a fresh product at the store location; and
storing and communicating the updated indication, wherein
communicating the stored indication and communicating the updated indication comprise presenting a webpage display of the store location,
receiving an indication of the availability of a fresh product comprises receiving an indication that the fresh product is currently available at the store location, and
communicating the indication comprises displaying the indication that the fresh product is currently available at the store location.

12. The method of claim 11, wherein communicating the stored indication comprises sending a message to the potential customer.

13. The method of claim 12, wherein communicating the stored indication comprises sending an email to the potential customer.

14. The method of claim 11, wherein communicating the stored indication comprises presenting a map of the plurality of locations and the information regarding the availability of a fresh product at the store location.

15. A method of providing to potential customers information regarding the availability of fresh products, comprising:
creating a customer profile corresponding to a potential customer, wherein the customer profile comprises a set of customer preferences for a fresh product;
storing the customer profile on a server in communication with at least one computer system;
receiving, from a first computer associated with at least one of a plurality of store locations, information regarding the availability of the fresh product at the store location;
storing the received information; and
communicating, based on the set of customer preferences in the customer profile, the received information to a second computer for sending a message, which is generated based on the set of customer preferences in the customer profile and is received after the creating of the customer profile, to the potential customer who has previously indicated, in the set of customer preferences in the customer profile, a request to receive the information regarding the availability of the fresh product, to inform the potential customer of the availability of the fresh product at the store location and of a street address of the store location, wherein
communicating the received information comprises presenting a webpage display of the store location,
receiving information regarding the availability of the fresh product comprises receiving an indication that the fresh product is currently available at the store location, and
communicating the received information comprises displaying the indication that the fresh product is currently available at the store location.

16. The method of claim 15, wherein creating a customer profile comprises receiving a preferred type of fresh product that is preferred by the potential customer.

17. The method of claim 16, wherein receiving information regarding the availability of the fresh product comprises receiving a type of fresh product available; wherein sending a message comprises matching the preferred type of fresh product in the customer profile to the type of fresh product available.

18. The method of claim 15, wherein creating a customer profile comprises receiving a preferred store location that is preferred by the potential customer, selected from the plurality of store locations.

19. The method of claim 18, wherein sending a message comprises matching the preferred store location to the store location.

20. The method of claim 15, wherein creating a customer profile comprises receiving a customer preference of time period during which the potential customer would like to receive the message.

21. The method of claim 15, wherein sending a message comprises sending an email to the potential customer.

* * * * *